(12) United States Patent
Chandan et al.

(10) Patent No.: US 10,041,695 B2
(45) Date of Patent: Aug. 7, 2018

(54) SCHEDULING FOR AIR CONDITIONERS AND OTHER APPLIANCES

(71) Applicant: Utopus Insights, Inc., Valhalla, NY (US)

(72) Inventors: Vikas Chandan, Bangalore (IN); Ravi Kothari, New Delhi (IN); Ashish Verma, New Delhi (IN)

(73) Assignee: Utopus Insights, Inc., Valhalla, NY (US)

(*) Notice: Subject to any disclaimer, the term of this patent is extended or adjusted under 35 U.S.C. 154(b) by 272 days.

(21) Appl. No.: 14/881,470

(22) Filed: Oct. 13, 2015

(65) Prior Publication Data

US 2017/0102158 A1   Apr. 13, 2017

(51) Int. Cl.

| G05D 23/00 | (2006.01) |
|---|---|
| F24F 11/00 | (2018.01) |
| G05B 15/02 | (2006.01) |
| G05D 23/19 | (2006.01) |
| F24F 11/30 | (2018.01) |
| F24F 11/62 | (2018.01) |
| F24F 110/10 | (2018.01) |
| F24F 130/00 | (2018.01) |
| F24F 130/10 | (2018.01) |
| F24F 11/61 | (2018.01) |
| F24F 11/46 | (2018.01) |

(52) U.S. Cl.
CPC ............ *F24F 11/006* (2013.01); *F24F 11/30* (2018.01); *F24F 11/62* (2018.01); *G05B 15/02* (2013.01); *G05D 23/1904* (2013.01); *G05D 23/1923* (2013.01); *F24F 11/46* (2018.01); *F24F 11/61* (2018.01); *F24F 2110/10* (2018.01); *F24F 2130/00* (2018.01); *F24F 2130/10* (2018.01); *G05B 2219/2642* (2013.01)

(58) Field of Classification Search
None
See application file for complete search history.

(56) References Cited

U.S. PATENT DOCUMENTS

| 8,538,586 B2 | 9/2013 | Amundson et al. |
|---|---|---|
| 2013/0151012 A1 | 6/2013 | Shetty et al. |
| 2013/0274928 A1* | 10/2013 | Matsuoka .......... G05D 23/1904 700/276 |
| 2014/0018971 A1* | 1/2014 | Ellis ...................... G06Q 10/04 700/297 |
| 2014/0316581 A1 | 10/2014 | Fadell et al. |

(Continued)

*Primary Examiner* — Philip Wang
(74) *Attorney, Agent, or Firm* — Sheppard, Mullin, Richter & Hampton LLP (57) ABSTRACT

Methods and arrangements for computing a schedule for central air conditioning. Inputs are received, including: a monetary budget relative to a predetermined time period; an occupancy profile relative to the predetermined time period; and at least one of: electricity rates relative to the predetermined time period, and technical specifications of the central air conditioning. A target indoor temperature is determined based on the received inputs, with respect to different timepoints within the predetermined time period. An air conditioning schedule is determined for the different timepoints within the predetermined time period, wherein this determining includes reducing a quantitative measure relating to discomfort. Other variants and embodiments are broadly contemplated herein.

19 Claims, 6 Drawing Sheets

$$\underset{\{u, T_{SP}\}}{\text{Minimize}} : A^T_{\{T>T_u|T<T_L\}}$$

subject to:
$$\frac{\sum_{k=0}^{T/T_s} u(k)c(k)m_s c_p (T_s - T(k))}{COP} \leq Bud,$$

$$T(k) = T(k-1) + T_s[-u(k-1)Q_{AC}(k-1) + Q_{ext}(k-1) + Q_{int}(k-1)]$$

$$u(k) = \begin{cases} 1, \text{ if } T(k) > T_{SP}(k) + \theta \\ 0, \text{ if } T(k) < T_{SP}(k) - \theta \\ u(k-1) \text{ otherwise} \end{cases}$$

419

| $T_u$ | Upper comfort temp | $T_{SP}$ | Set point temperature | $COP$ | AC coefficient of performance |
|---|---|---|---|---|---|
| $T_L$ | Lower comfort temp | $c$ | Cost of electricity | $\theta$ | Hysteresis setting in AC |

421

(56) References Cited

U.S. PATENT DOCUMENTS

| | | | |
|---|---|---|---|
| 2014/0371923 A1* | 12/2014 | Weaver | H02J 3/14 |
| | | | 700/276 |
| 2015/0025693 A1* | 1/2015 | Wu | F24F 11/0012 |
| | | | 700/278 |
| 2015/0142179 A1 | 5/2015 | Ito et al. | |
| 2016/0356515 A1* | 12/2016 | Carter | G05D 23/1917 |
| 2017/0159955 A1* | 6/2017 | Kobayashi | F24F 11/006 |

* cited by examiner

FIG. 2

$$T(k) = T(k-1) + T_s[-u(k-1)Q_{AC}(k-1) + Q_{ext}(k-1) + Q_{int}(k-1)]$$

where
$$Q_{AC}(k-1) = m_s c_p (T_s - T(k)),$$
$$Q_{ext}(k-1) = hA(T_a(k-1) - T(k-1)),$$
$$Q_{int}(k-1) = n(k-1)Q_0 + \epsilon$$

| $T$ | Zone temperature | $u$ | AC on/off status (1/0) | $hA$ | Heat transfer coefficient with ambient | $n$ | Occupancy |
|---|---|---|---|---|---|---|---|
| $T_s$ | Sample time | $m_s$ | Flow rate of conditioned air | $T_a$ | Ambient temperature | $\epsilon$ | Heat transfer from internal sources besides occupancy |
| $k$ | Time instance | | | | | | |

SCHEDULING FOR AIR CONDITIONERS AND OTHER APPLIANCES

BACKGROUND

Generally, with significant increases in electricity costs, it is recognized that many individuals and other entities are constantly addressing a tradeoff between a need for physical comfort and a genuine desire to keep electric bills to a manageable level. Though this can apply to a wide range of electrical appliances, air conditioning provides a useful example. Thus, among other issues, determining an optimal level of air conditioning for a given indoor environment (also referred to herein, interchangeably, as a "target" level of air conditioning), while balancing the oft mutually exclusive concerns of comfort and cost, is a technically challenging problem that is not easily addressed by manual calculation or estimation.

BRIEF SUMMARY

In summary, one aspect of the invention provides a method of computing a schedule for central air conditioning, said method comprising: utilizing at least one processor to execute computer code that performs the steps of: receiving inputs comprising: a monetary budget relative to a predetermined time period; an occupancy profile relative to the predetermined time period; and at least one of: electricity rates relative to the predetermined time period, and technical specifications of the central air conditioning; determining a target indoor temperature based on the received inputs, with respect to different timepoints within the predetermined time period; and determining an air conditioning schedule for the different timepoints within the predetermined time period; said determining of an air conditioning schedule comprising reducing a quantitative measure relating to discomfort.

Another aspect of the invention provides an apparatus for computing a schedule for central air conditioning, said apparatus comprising: at least one processor; and a computer readable storage medium having computer readable program code embodied therewith and executable by the at least one processor, the computer readable program code comprising: computer readable program code configured to receive inputs comprising: a monetary budget relative to a predetermined time period; an occupancy profile relative to the predetermined time period; and at least one of: electricity rates relative to the predetermined time period, and technical specifications of the central air conditioning; computer readable program code configured to determine a target indoor temperature based on the received inputs, with respect to different timepoints within the predetermined time period; and computer readable program code configured to determine an air conditioning schedule for the different timepoints within the predetermined time period, via reducing a quantitative measure relating to discomfort.

Another aspect of the invention provides a computer program product for computing a schedule for central air conditioning, said computer program product comprising: a computer readable storage medium having computer readable program code embodied therewith, the computer readable program code comprising: computer readable program code configured to receive inputs comprising: a monetary budget relative to a predetermined time period; an occupancy profile relative to the predetermined time period; and at least one of: electricity rates relative to the predetermined time period, and technical specifications of the central air conditioning; computer readable program code configured to determine a target indoor temperature based on the received inputs, with respect to different timepoints within the predetermined time period; and computer readable program code configured to determine an air conditioning schedule for the different timepoints within the predetermined time period, via reducing a quantitative measure relating to discomfort.

An additional aspect of the invention provides a method comprising: receiving inputs comprising: a monetary budget relative to a predetermined time period; an occupancy profile relative to the predetermined time period; electricity rates relative to the predetermined time period; technical specifications of the central air conditioning; data relative to forecasted weather for the predetermined time period; and data input manually by a user comprising at least one of: updated monetary budget data, and updated data for the occupancy profile; determining a target indoor temperature based on the received inputs, with respect to different timepoints within the predetermined time period; and determining an air conditioning schedule for the different timepoints within the predetermined time period; said determining of an air conditioning schedule comprising minimizing a quantitative measure relating to discomfort comprising deviation from a predefined target indoor temperature; said minimizing comprising minimizing a number and duration of user comfort violations, as defined by deviation from the predefined target indoor temperature.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an exemplary embodiment, most if not all of the process steps, components and outputs discussed with respect to FIGS. 1-4 can be performed or utilized by way of a processing unit or units and system memory such as those indicated, respectively, at 16' and 28' in FIG. 6, whether on a server computer, a client computer, a node computer in a distributed network, or any combination thereof.

Broadly contemplated herein, in accordance with at least one embodiment of the invention, are methods and arrangements which provide for computing, in advance, a schedule for running AC (air conditioning) based on a pre-defined user cost budget (or monetary budget) and a known cooling requirement of the user. This can involve computing the schedule via reducing or minimizing user discomfort, e.g., as a quantitative measure representing one or more deviations from one or more target indoor temperatures, and taking into account electricity costs. There may also be involved a schedule which is further customized based on room or building specifications, a user occupancy profile, and/or information provided by one or more users on specific events (e.g., social gatherings).

Figure 1:
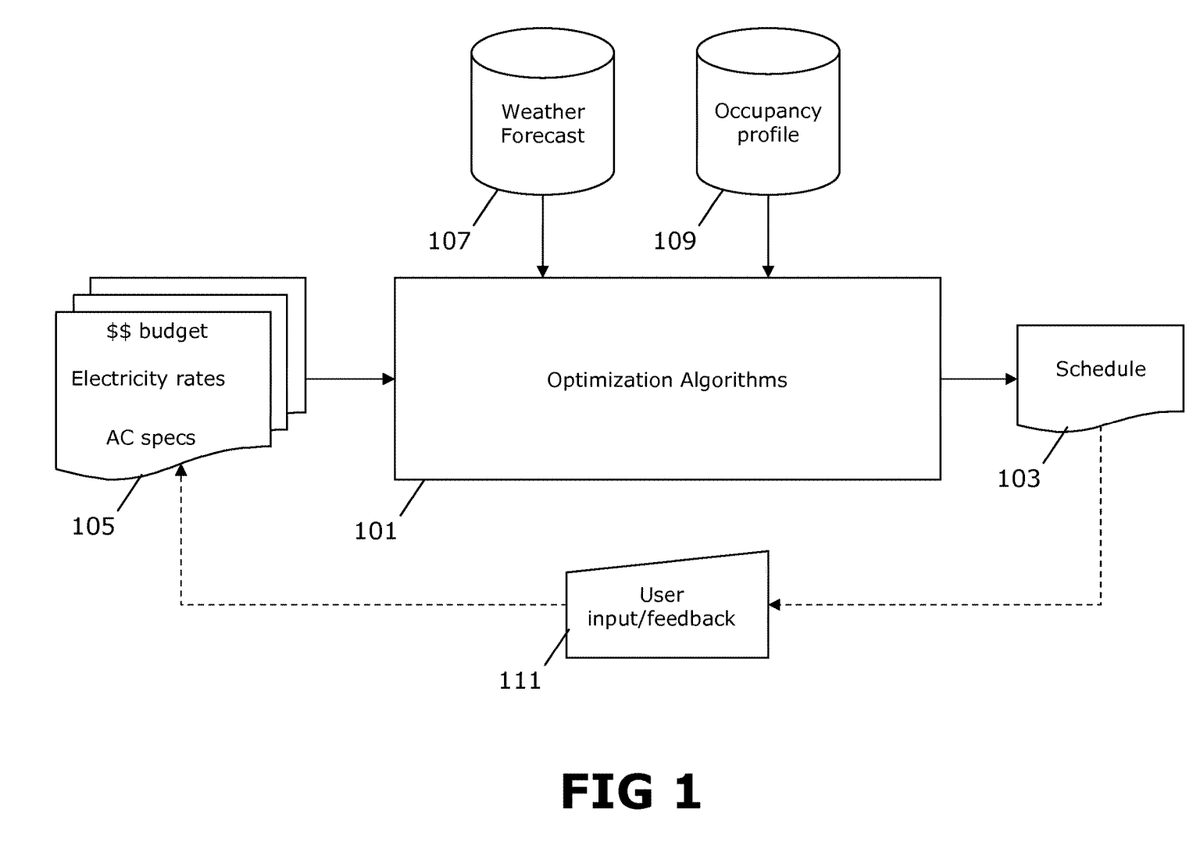
FIG. 1 schematically illustrates a scheduling tool.

The features discussed above, and others, relating to at least one embodiment of the invention, will be better appreciated from the discussion which follows FIG. 1 schematically illustrates a scheduling tool, in accordance with at least one embodiment of the invention. As such, the tool is mainly embodied by a set of optimization algorithms 101 which accept inputs toward generating an optimal (or target) AC schedule 103 for a given duration (e.g., a monthly billing cycle). AC, as generally discussed herein, can generally apply to central air conditioning as provided for a house or building (e.g., apartment building). The aforementioned inputs can include variable, dwelling-specific inputs 105 (e.g., monetary budget, electricity rates and AC specifications) and other inputs such as a longer-term weather forecast 107 and an occupancy profile 109 (of the associated house or building). The occupancy profile may be defined as an overview, over cyclically defined time periods (e.g., on a daily basis or weekly basis) as to how many people are in the space to be air conditioned, and at what times. Thus, the schedule 103 may contain set-points & on-off cycles based on inputs 105, 107 and 109. The tool can produce an optimal (or target) schedule by minimizing the number of user comfort violations, and the duration of such violations. Such violations may be defined as a breaching of a predetermined threshold, or thresholds, related to parameters which help define user comfort; these may form part or all of a determination of one or more quantitative measures of (or relating to) user discomfort, as will be discussed in further detail herein.

In accordance with at least one embodiment of the invention, also shown in FIG. 1 is a provision for the incorporation of user input or feedback once the schedule 103 is optimized and set (111). Thus, the user is able to further customize the schedule, e.g., based on some specific events he/she may be aware of that could warrant altering the schedule 103. For instance, if he/she is aware that no one will be present during a given time, he/she can adjust the schedule so as to provide less cooling. Likewise, if he/she is aware of several additional people visiting the dwelling at a given time (e.g., for a party), then input or feedback 111 can allow for more cooling during that time. Feedback 111 can also incorporate monetary budget adjustments from the user, thereby permitting a recalculation by the algorithm to take such adjustments into account.

Figure 2:
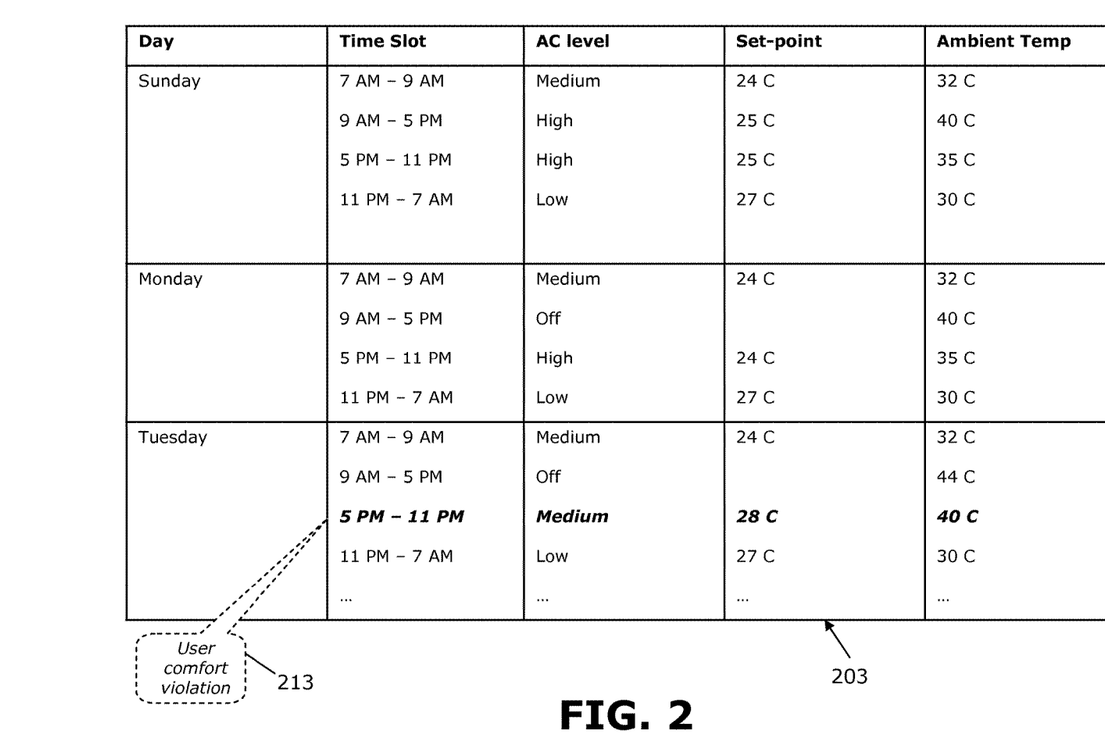
FIG. 2 illustrates a sample air conditioning schedule.

In accordance with at least one embodiment of the invention, for illustrative purposes, FIG. 2 depicts an example of an air conditioning schedule 203, showing an instance of a user comfort violation 213. A user comfort violation, generally, can be defined as a quantitative measure in accordance with essentially any suitable predetermined criteria but as such can correspond to a significant difference between a set-point temperature and an ambient (i.e., outdoor) temperature. Generally, a set-point represents the temperature at which the AC aims to keep the internal air temperature of a defined space within a house or other building. The AC level can correspond to a fan/compressor speed (i.e., a fan speed and/or compressor speed) and/or compressor duty cycle and/or general setting of an AC unit, while the set-point can correspond to a specific temperature set by thermostat or other arrangement.

In accordance with at least one embodiment of the invention, by way of general considerations, two types of ACs, among others, can be accommodated. In an "on-off" air conditioner, the compressor is either on or off, while in a BLDC (brushless DC) air conditioner, the unit can run at different compressor speeds and hence cooling rates. Generally, outdoor ambient temperature influences the indoor comfort range and associated set-point. Instantaneous electricity consumption can be computed based on the AC type & specifications (tonnage, etc.) and the difference between outdoor temperature and set-point. Total electricity consumption can then be computed based on the foregoing considerations, and on the thermal load of the room/building (size, occupancy, etc.).

Figure 3:
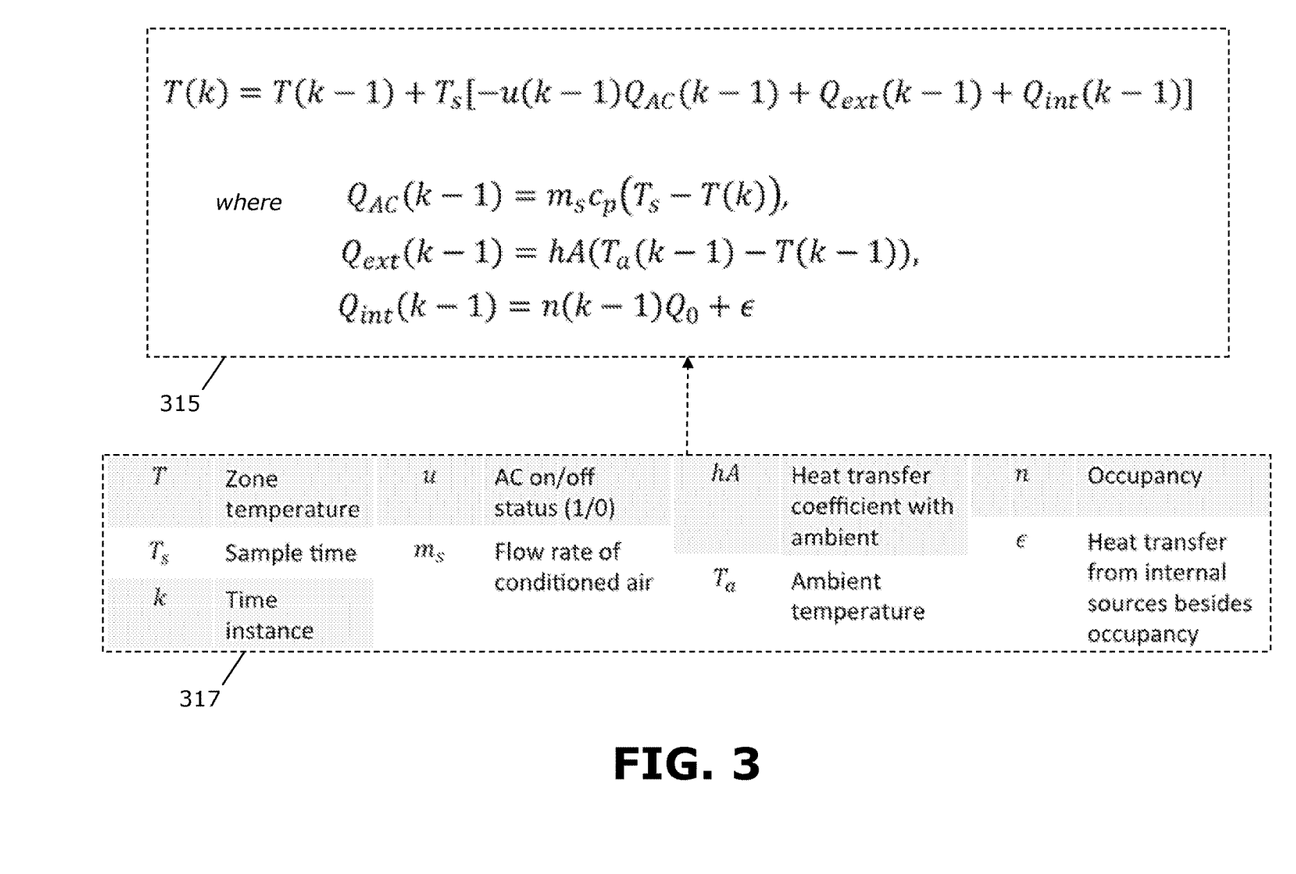
FIG. 3 illustrates aspects of a user environment modeling portion of a scheduling methodology.
Figure 4:
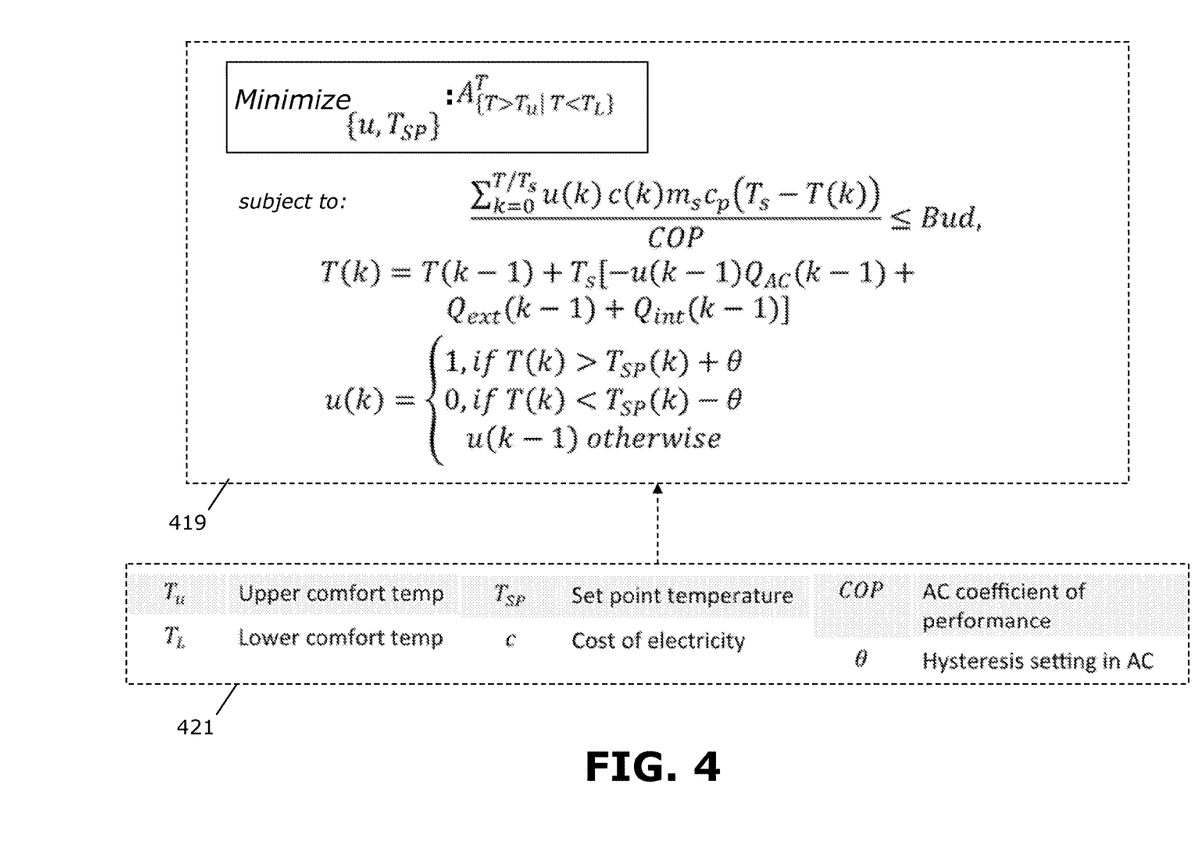
FIG. 4 illustrates aspects of an air conditioning optimization portion of a scheduling methodology.

In accordance with at least one embodiment of the invention, an appliance scheduling methodology, particularly one for use by air conditioning systems, may include user environment modeling as well as AC optimization. To this end, FIG. 3 depicts a user environment modeling portion of a scheduling methodology, and FIG. 4 depicts an air conditioning optimization portion of the methodology; though provided here merely by way of illustrative and non-restrictive example, these portions of a scheduling methodology could be employed as a portion or the entirety of the optimization algorithm 101 in FIG. 1. Merely for illustrative purposes, the methodology set forth via FIGS. 3 and 4 assumes on-off air conditioning.

In accordance with at least one embodiment of the invention, as shown in FIG. 3, a user environment modeling portion of a scheduling methodology can include modeling equations 315 with parameters 317. Here, Q generally refers to heat gain, specified via different subscripts, thus: from air conditioning ("AC"), from ambient or external component of heat ("ext") and from human occupants and other sources inside the air conditioned space, thus an "internal" component of heat ("int"). $Q_0$ refers to a heat gain per occupant based solely on occupancy, i.e., the presence of one or more individuals in a pre-defined space. The parameter $c_p$ represents the specific heat capacity of air. Modeling parameters hA (coefficient of heat transfer with ambient) and ε (heat transfer from internal sources besides occupancy) can be computed on the basis of historical data (e.g., zone/return air temperature, ambient temperature, occupancy and AC on/off state) and metadata (e.g., flow rate of conditioned air, temperature of conditioned air, heat gain per occupant, and the specific heat capacity of air).

In accordance with at least one embodiment of the invention, as shown in FIG. 4, an air conditioning optimization portion of a scheduling methodology can include modeling equations 419 with parameters 421 (those listed are not otherwise covered in FIG. 3). Here, the quantity being minimized, $A_{\{T>T_u|T<T_L\}}^T$ (in other words, what may be considered a quantitative measure of discomfort being reduced or minimized), represents the area under a temperature vs. time curve which corresponds to comfort violations for a look-ahead time window T. Bud represents a maximum monetary budget constraint, while the T(k) equation is the user environment modeling equation from FIG. 3. The u(k) equation provides on/off control logic which governs the AC. Generally, based on the cost of energy, a user-prescribed monetary budget, upper and lower temperature comfort bounds and AC efficiency, the magnitude of user comfort violations over a look-ahead time window are minimized, by way of determining optimal AC operation (e.g., set points and corresponding on/off times).

While embodiments of the invention, as discussed herein, involve a context of central air conditioning, it should be appreciated and understood that the methods and arrangements discussed and broadly contemplated herein can be applicable to a wide variety of other contexts. For instance, while a very wide variety of appliances other than central air conditioning are conceivable in this regard, one viable variant application can be represented by a central heating system.

It can be appreciated from the foregoing that, in accordance with at least one embodiment of invention, a technical improvement is represented at least via methods and arrangements which compute, in advance, a schedule for running AC (air conditioning) based on a pre-defined user cost budget and a known cooling requirement of the user.

In accordance with at least one embodiment of the invention, very generally, quantitative values as determined herein, or other data or information as used or created herein, can be stored in memory or displayed to a user on a screen, as might fit the needs of one or more users.

Figure 5:
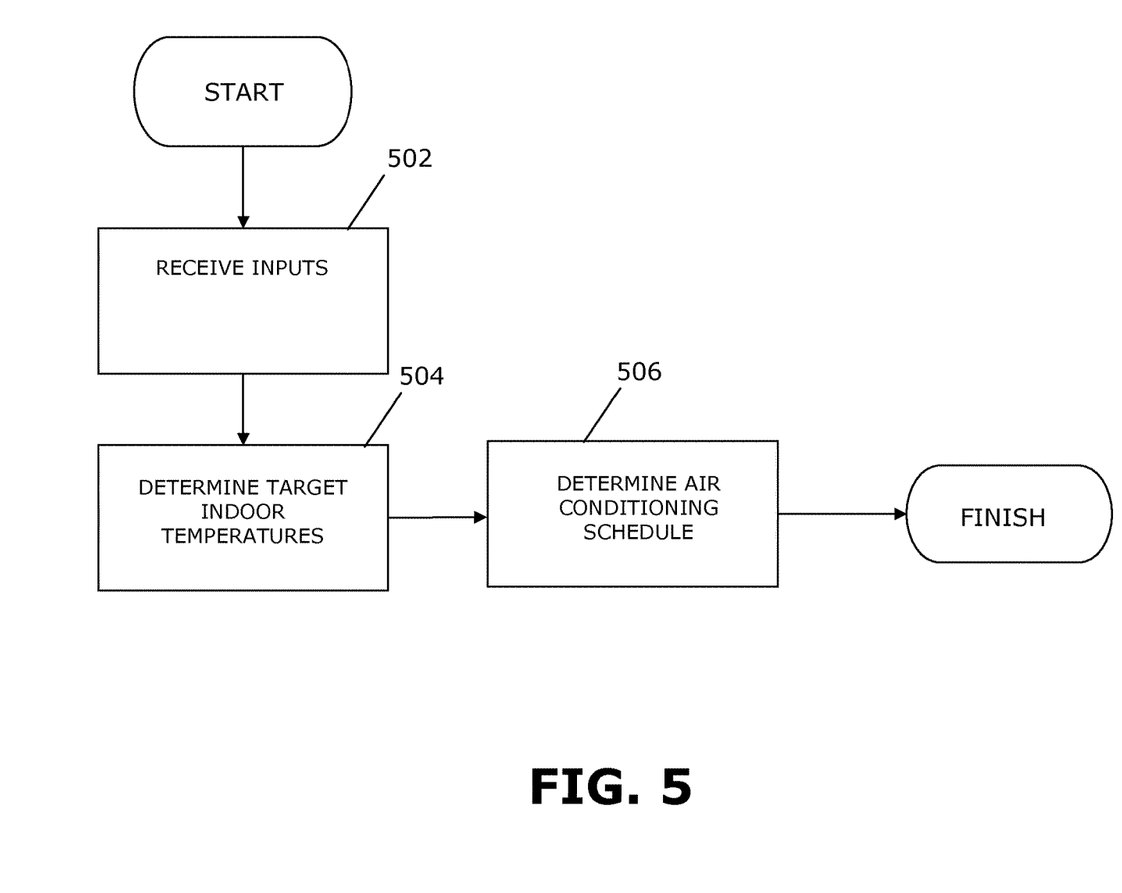
FIG. 5 sets forth a process more generally for computing a schedule for central air conditioning

FIG. 5 sets forth a process more generally for computing a schedule for central air conditioning, in accordance with at least one embodiment of the invention. It should be appreciated that a process such as that broadly illustrated in FIG. 5 can be carried out on essentially any suitable computer system or set of computer systems, which may, by way of an illustrative and non-restrictive example, include a system such as that indicated at 12' in FIG. 6. In accordance with an example embodiment, most if not all of the process steps discussed with respect to FIG. 5 can be performed by way of a processing unit or units and system memory such as those indicated, respectively, at 16' and 28' in FIG. 6.

As shown in FIG. 5, in accordance with at least one embodiment of the invention, inputs are received, including: a monetary budget relative to a predetermined time period; an occupancy profile relative to the predetermined time period; and at least one of: electricity rates relative to the predetermined time period, and technical specifications of the central air conditioning (502). A target indoor temperature is determined based on the received inputs, with respect to different timepoints within the predetermined time period (504). An air conditioning schedule is determined for the different timepoints within the predetermined time period, wherein this determining includes reducing a quantitative measure relating to discomfort (506).

Figure 6:
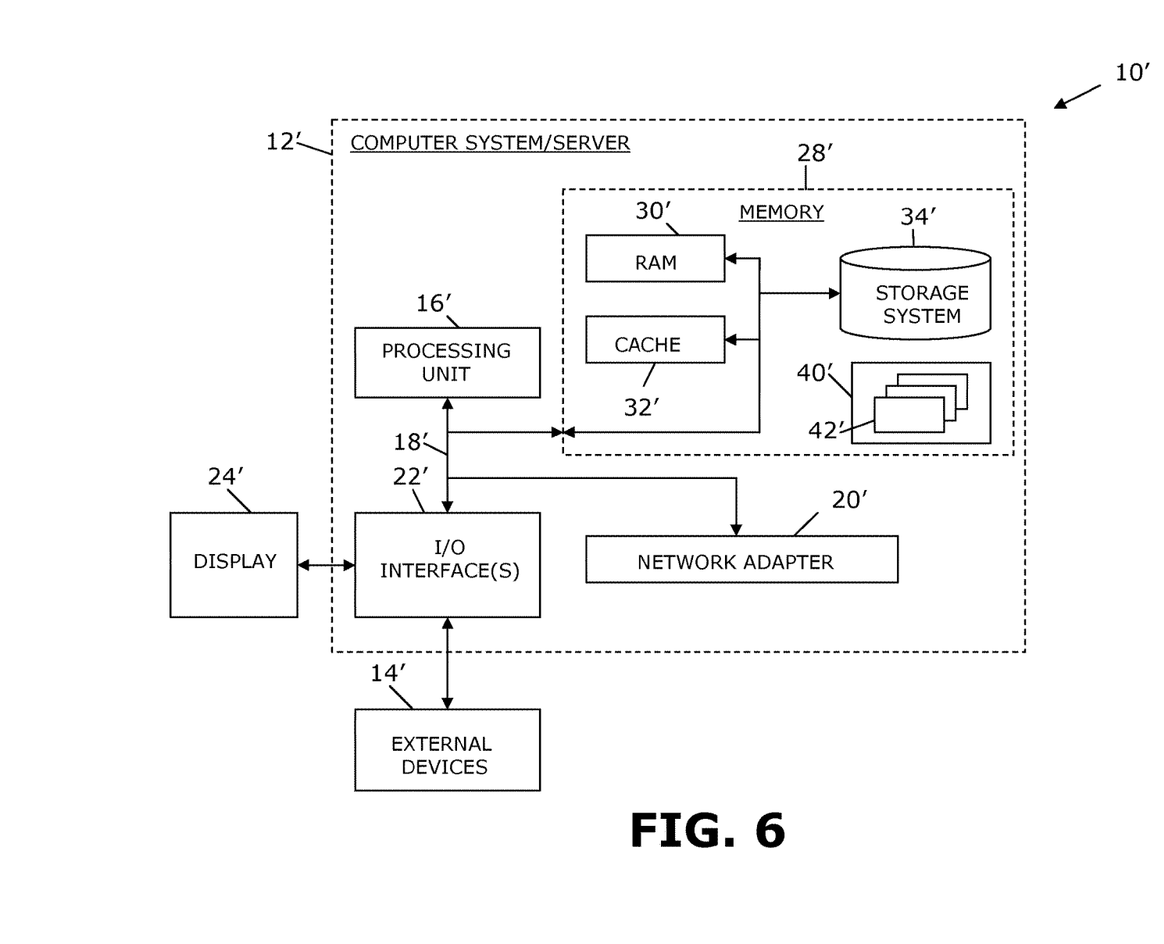
FIG. 6 illustrates a computer system.

Referring now to FIG. 6, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of computing a schedule for central air conditioning, said method comprising:
   utilizing at least one processor to execute computer code that performs the steps of:
      receiving inputs comprising:
         a monetary budget relative to a predetermined time period;
         an occupancy profile relative to the predetermined time period; and
         at least one of electricity rates relative to the predetermined time period, and technical specifications of the central air conditioning;
      determining a target indoor temperature based on the received inputs with respect to different timepoints within the predetermined time period; and
      determining an air conditioning schedule for the different timepoints within the predetermined time period;
      said determining of the air conditioning schedule comprising reducing a quantitative measure relating to discomfort, wherein said reducing the quantitative measure related to discomfort comprises minimizing a number and duration of user comfort violations, as defined by deviation from the determined target indoor temperature.

2. The method according to claim 1, wherein said receiving of inputs comprises receiving both of the electricity rates relative to the predetermined time period, and the technical specifications of the central air conditioning.

3. The method according to claim 1, wherein said receiving of inputs comprises receiving data relative to forecasted weather for the predetermined time period.

4. The method according to claim 1, wherein the quantitative measure relating to discomfort comprises deviation from a predefined target indoor temperature.

5. The method according to claim 1, wherein said receiving of inputs comprises receiving data input manually by a user.

6. The method according to claim 5, wherein said receiving of data input manually by the user comprises receiving at least one of updated monetary budget data, and updated data for the occupancy profile.

7. The method according to claim 1, wherein said determining of the air conditioning schedule comprises determining an air conditioning setpoint for different timepoints within the predetermined time period.

8. The method according to claim 7, wherein said determining of the air conditioning schedule comprises determining an on/off status or fan/compressor speed of the central air conditioning for the different timepoints within the predetermined time period.

9. The method according to claim 7, wherein said determining of the air conditioning schedule comprises determining an air conditioning fan/compressor speed for the different timepoints within the predetermined time period.

10. The method according to claim 1, wherein said determining of the air conditioning schedule comprises applying a scheduling methodology comprising a user environment modeling portion and an air conditioning optimization portion.

11. The method according to claim 10, wherein the user environment modeling portion comprises modeling at least one zone temperature for at least one time instance.

12. The method according to claim 11, wherein said modeling comprises incorporating:
   a determination of air conditioning heat transfer or cooling provided to a user environment;
   a determination of heat gain from an ambient source; and
   a determination of heat gain from at least one source associated with the user environment.

13. The method according to claim 12, wherein said modeling further comprises incorporating:
   a first modeling parameter corresponding to a coefficient of heat transfer with ambient; and a second modeling parameter corresponding to heat transfer from at least one source associated with the user environment other than occupancy of the user environment.

14. The method according to claim 10, wherein:

the air conditioning optimization modeling portion comprises said reducing the quantitative measure related to discomfort;

said reducing comprising minimizing an area under a temperature-time curve corresponding to user comfort violations for a predetermined look-ahead time window.

15. The method according to claim 14, wherein said minimizing the area under the temperature-time curve is subject to a maximum monetary budget constraint, the user environment modeling portion, and on/off control logic governing the central air conditioning.

16. The method according to claim 15, wherein the user environment modeling portion comprises modeling at least one zone temperature for at least one time instance.

17. An apparatus for computing a schedule for central air conditioning, said apparatus comprising:

at least one processor; and a computer readable storage medium having computer readable program code embodied therewith and executable by the at least one processor, the computer readable program code comprising:

computer readable program code configured to receive inputs comprising:

a monetary budget relative to a predetermined time period;

an occupancy profile relative to the predetermined time period;

and at least one of electricity rates relative to the predetermined time period, and technical specifications of the central air conditioning;

computer readable program code configured to determine a target indoor temperature based on the received inputs with respect to different timepoints within the predetermined time period; and computer readable program code configured to determine an air conditioning schedule for the different timepoints within the predetermined time period, via reducing a quantitative measure relating to discomfort, wherein the reducing the quantitative measure related to discomfort comprises minimizing a number and duration of user comfort violations, as defined by deviation from the determined target indoor temperature.

18. A computer program product for computing a schedule for central air conditioning, said computer program product comprising:

a non-transitory computer readable storage medium having computer readable program code embodied therewith, the computer readable program code comprising:

computer readable program code configured to receive inputs comprising:

a monetary budget relative to a predetermined time period;

an occupancy profile relative to the predetermined time period; and at least one of electricity rates relative to the predetermined time period, and technical specifications of the central air conditioning;

computer readable program code configured to determine a target indoor temperature based on the received inputs with respect to different timepoints within the predetermined time period; and computer readable program code configured to determine an air conditioning schedule for the different timepoints within the predetermined time period via reducing a quantitative measure relating to discomfort, wherein the reducing the quantitative measure related to discomfort comprises minimizing a number and duration of user comfort violations, as defined by deviation from the determined target indoor temperature.

19. A method comprising:

receiving inputs comprising:

a monetary budget relative to a predetermined time period;

an occupancy profile relative to the predetermined time period;

electricity rates relative to the predetermined time period;

technical specifications of central air conditioning;

data relative to forecasted weather for the predetermined time period; and data input manually by a user comprising at least one of updated monetary budget data, and updated data for the occupancy profile;

determining a target indoor temperature based on the received inputs with respect to different timepoints within the predetermined time period; and determining an air conditioning schedule for the different timepoints within the predetermined time period;

said determining of the air conditioning schedule comprising minimizing a quantitative measure relating to discomfort comprising deviation from a predefined target indoor temperature; and said minimizing comprising minimizing a number and duration of user comfort violations, as defined by the deviation from the predefined target indoor temperature.

* * * * *